United States Patent [19]

Barnett et al.

[11] 4,412,569

[45] Nov. 1, 1983

[54] TREE HARVESTING METHODS AND MACHINES

[75] Inventors: John S. Barnett, Putaruru; Sydney D. B. Cochrane, Tokoroa, both of New Zealand

[73] Assignee: Waratah General Engineering Ltd., Tokoroa, New Zealand

[21] Appl. No.: 182,980

[22] Filed: Sep. 2, 1980

[30] Foreign Application Priority Data

Aug. 31, 1980 [NZ] New Zealand .................. 191447

[51] Int. Cl.³ .................................. A01G 23/08
[52] U.S. Cl. ........................... 144/3 D; 144/2 Z; 144/338
[58] Field of Search ............. 144/2 Z, 3 D, 34 E, 144/309 AC, 34 R; 83/928

[56] References Cited

U.S. PATENT DOCUMENTS

| | | | |
|---|---|---|---|
| 3,323,563 | 6/1967 | Larson | 144/2 Z |
| 3,536,113 | 10/1970 | Sutherland | 144/3 D |
| 3,576,203 | 4/1971 | Cote | 144/3 D |
| 3,735,786 | 5/1973 | Vit | 144/2 Z |
| 3,763,904 | 10/1973 | Eynon | 144/2 Z |
| 3,974,866 | 8/1976 | Saarenketo | 144/3 D |

FOREIGN PATENT DOCUMENTS 2459884 8/1975 Fed. Rep. of Germany ...... 144/309 AC

Primary Examiner—W. D. Bray
Attorney, Agent, or Firm—Holman & Stern

[57] ABSTRACT

This invention concerns a method of tree harvesting which in its simplest form provides for a method of delimbing the branches of a standing tree, which delimbed tree may be sheared off from its base and positioned in a stack for collection.

There is provided an apparatus for attachment to a prime mover vehicle including a support means, and a head member. The head member may be positioned about an upper portion of a standing tree, and in one preferred embodiment, the top may be sheared off by shearing means. The head member may provide delimbing means, the arrangement being such that the support for the support member is releasable so that the head member may move down the tree to its base, during which movement it delimbs the tree, and wherein the delimbed tree may then be clamped by said head member, sheared off and then positioned where required.

19 Claims, 2 Drawing Figures

TREE HARVESTING METHODS AND MACHINES

BACKGROUND OF THE INVENTION

1. Field of the Invention

This invention concerns improvements in and relating to tree harvesting methods and machines, and more particularly concerns methods of delimbing, shearing, and depositing trees.

2. Description of the Prior Art

It has been known to provide tree harvesters in which a clamping and shearing head is provided at one end of an extendible boom, whereby a tree can be felled, and the felled tree deposited on a delimbing station which is provided along a prime mover vehicle. The delimbing station is known to include a delimbing head and a top shear unit. The tree is grasped and securely held on the delimbing station, and the delimbing head moves along the length of the felled tree to delimb same, whereafter the head of the tree is sheared off, and the tree deposited into collection arms. This type of tree harvester is disclosed in U.S. Pat. No. 3,734,152, and suffers from the disadvantage that a large force is required to effect the delimbing action, and the harvester is slow and lacks manoeuvreability through the size of the delimbing station.

Furthermore, it has been known to provide tree harvesters of this type which are moved by some mechanical or hydraulic force up the trunk of a standing tree so as to delimb same. This type of tree harvester is described by way of example only in U.S. Pat. No. 3,720,246. This type of harvester, and related types of harvesters in which delimbing heads are pulled up the trunk of a tree, suffer from the disadvantage that they may ride over the smaller branches of a tree so as to avoid delimbing same. Further, movement of a delimbing mechanism up a tree required additional force to sever the limbs, and is also movement against gravitational force.

Therefore, in recent developments it has been known to provide tree harvesting methods and associated machines for delimbing, shearing and depositing trees, in which a head is adapted to perform the functions of delimbing, shearing, and depositing trees. The types of such tree harvesting methods and machines known to the applicant include U.S. Pat. Nos. 3,974,866; 3,536,113; 3,532,141; 3,587,682.

The first Patent relates to a machine which provides a head which grafts the tree, with an upper portion being severed, turned and lowered through a delimbing means positioned on the head which remains fixed to the tree. This invention once again provides that the delimbing means is effectively moved up the trunk, by virtue of the upper part of the tree being lowered through the fixed delimbing means. The invention suffers from the further disadvantage that the delimbing means cannot be used for the lower trunk of the tree.

The other tree harvester and associated methods referred to in U.S. Pat. No. 3,536,113, includes a device which is positioned on and supported by a tree and which is then adapted to top, delimb, and sever the trunk.

This tree harvester depends upon support from the tree to perform all of its functions, which means that it is slow and inefficient in operation.

BRIEF SUMMARY OF THE INVENTION

It is therefore an object of the present invention to provide a method of tree harvesting, and a tree harvester which performs the functions of delimbing, shearing and depositing trees in a fast and efficient manner, by providing a head means which is controlled at all times supported by a corresponding support means mounted on a prime mover vehicle.

It is also an object of this invention to obviate at least some of the disadvantages of tree harvesters known at the present time, and to provide a method and a corresponding apparatus for delimbing trees before they are felled.

According to the invention there is provided a method of harvesting a tree whereby a head member may be supported by a support member and positioned about the upper trunk of a standing tree, delimbing means being provided in said head member, the support for said support member being releasable so that said head member may move down the tree to its base during which movement it delimbs the tree, and where the delimbed tree may then be clamped by said head member, sheared off and then positioned where required.

Further according to this invention there is provided a tree harvesting apparatus for attachment to a prime motor vehicle, said apparatus comprising a support member, a head member mounted on said support member including a pair of clamping arm members and delimbing means, and including at least one shear means, and wherein the head member is positionable about the upper trunk of a standing tree, the support for said support member being releasable so that the head member may move down the tree to its base, during which movement the delimbing means of the head member delimbs the tree, whereafter the clamping arm members may engage and support the tree which may be sheared off and then positioned where required.

Further, according to this invention there is provided a tree harvesting apparatus for attachment to a prime mover vehicle, said apparatus comprising a controlled support means for a support member, a head member mounted on said support member and including a pair of clamping arm members and delimbing means, and including a pair of shear means, and wherein the head member is positionable by said support member about the upper trunk of a standing tree, and wherein a second shear means may shear the top off the tree, the controlled support means for said support member being at least partially releasable so that the head member may move down the tree to its base, during which movement it delimbs the tree, whereafter the clamping arm members may engage and support the tree which may be sheared off by said first shear means, and then positioned where required.

BRIEF DESCRIPTION OF THE DRAWING

Further aspects of this invention which should be considered in all its novel aspects, will become apparent from the following description given by way of example of one preferred embodiment of the invention and in which reference is made to the accompanying drawings, in which.

DETAILED DESCRIPTION

Figure 1:
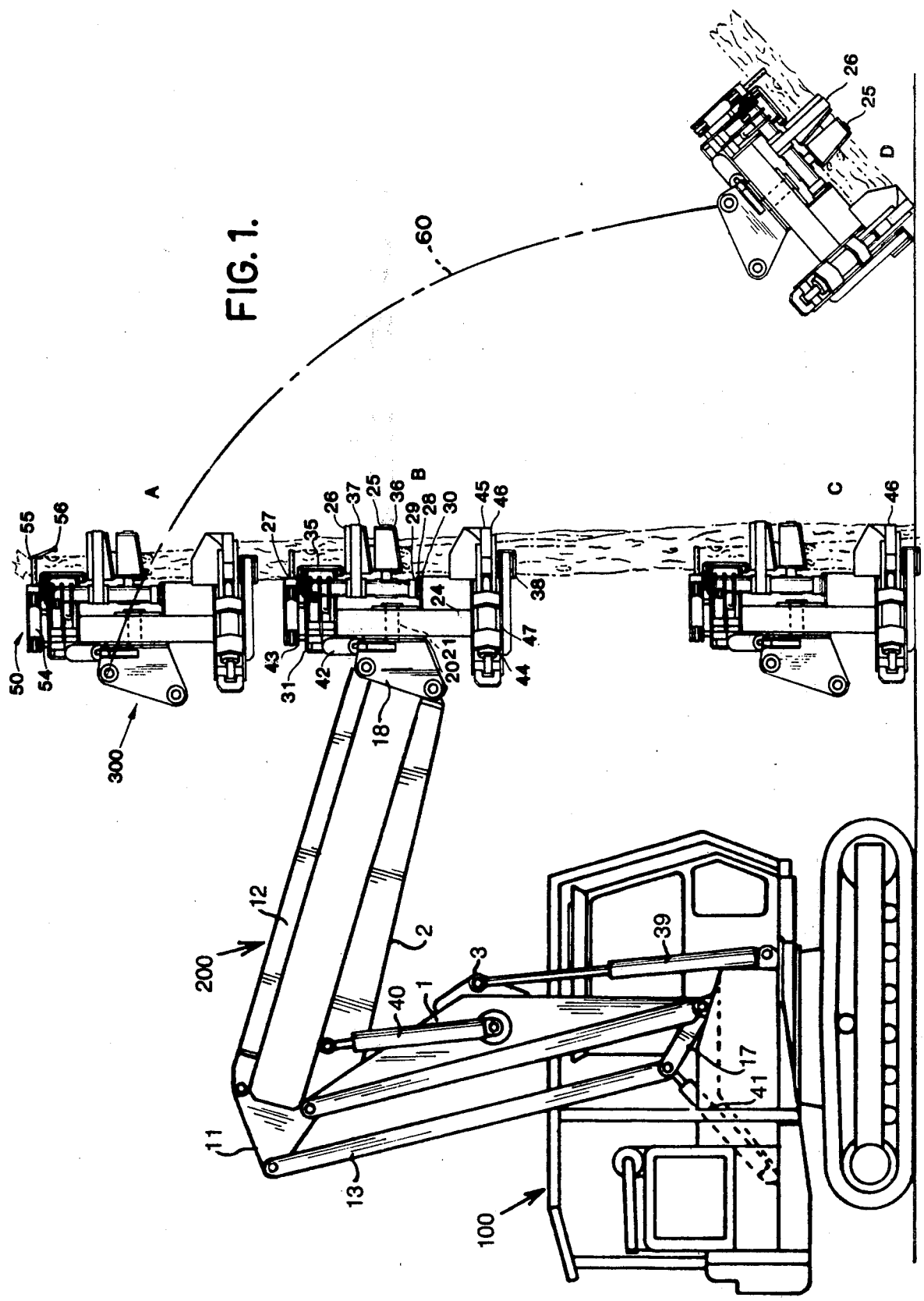
FIG. 1: is a diagrammatic representation in elevation of the preferred form of the invention showing the various phases of operation.
Figure 2:
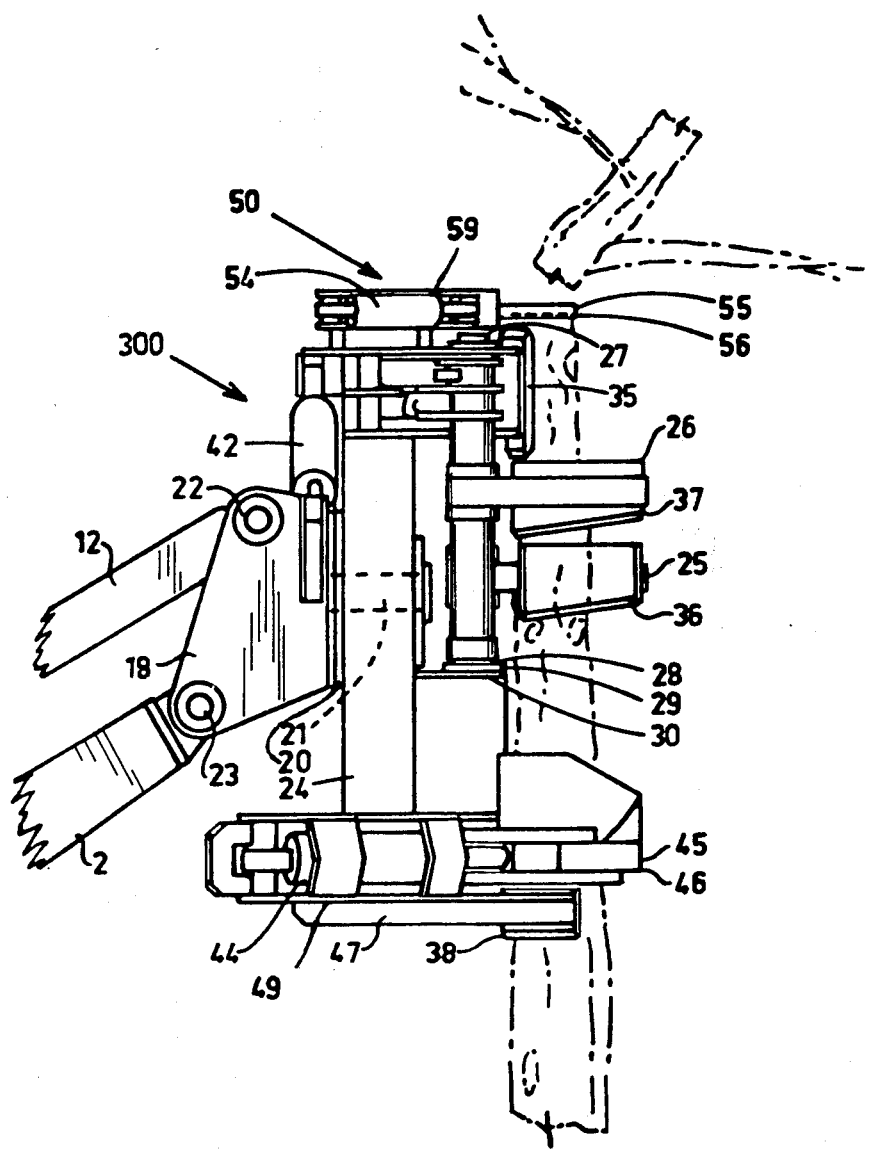
FIG. 2: is an elevational view of one preferred embodiment of the head member according to the present invention.

The present invention in its broadest form relates to a method, and an associated apparatus for delimbing, and in its preferred form also for topping and felling trees, the mechanism of which is adapted for attachment to a prime mover vehicle, for example a suitably tracked vehicle or rubbed tired articulated tractor. In the drawings, a particular type of tracked vehicle is shown, but it is to be appreciated that this is by way of example, and not in any respect by way of limitation of the scope of the invention.

The method of the invention will become apparent from the ensuing description of one preferred apparatus for performance of the method of the invention, which is described in the drawings. In particular, the tree delimbing and felling mechanism includes a support member provided adjacent the front of a prime mover vehicle. In the preferred form of the invention, the support member may include a pivotally mounted boom 1, in turn pivotally linked to an arm 2, so as to provide a support member of a type known in the art for various types of machinery provided on tracked vehicles. However, in the preferred form of the invention, a corresponding pair of parallel link members 12 and 13 may be provided to respectively extend in parallel with the arm and the boom. The arrangement is therefore such that the support member is comprised of a pair of simultaneously operable parallel linkages, respectively provided between the spacing link 17 and the parallel link triangle member 11, and between said triangle 11 and the support bracket 18 for the head member.

The support member may adjustably position the height of the head member by operation of boom cylinder 39, and arm cylinder 40, with the tilting of the head member relative to its normal vertical position being controllable by tilt cylinder 41 controlling the pivoting arrangement of the parallel linkage members.

It will be appreciated that the support member as herein described is so constructed as to fully support at all times a head member on the outer end of the support member. Furthermore, the control of the boom and the arm by respective cylinders 39 and 40 permit the head member 300 to be supported at any height as may be required, and according to the invention, to permit the head member to fall under gravity down a tree whilst fully supported thereon. This operation is effected by control of the cylinders in a manner to be described.

Now, the head member 300 comprises a body 24 pivotally connected by pivot pin 21 to an end plate 20 provided on said support bracket 18. This pivotable connection is controlled by a cylinder 42 which is adapted to control the pivotable movement or twist of the head member about said pivot pin 21. The arrangement is therefore such that the control of the tilting of the head member relative to its normal vertical axis by the operation of the parallel linkage arrangement of the support member, together with the control of the pivot or twist of said head member about its pivot pin 21 means that the head member is in effect universally coupled to the outer end of the support member. Furthermore, it will be appreciated that this coupling is fully controllable by the cylinders referred to.

The head member includes a pair of clamping arm members 25 and 26, each arm preferably being on a separate shaft 28, which shaft is rotatably housed in bearings 27 and 29 on mounting brackets 30 secured to the body 24. The rotational movement of each shaft 28 about its longitudinal axis is determined by an arm member cylinder 43 which is linked to a cam member 31 secured on each shaft 28.

In the preferred embodiment of the invention, the arm members 25 and 26 may be of a curved shape, (in plan), so that the arm members may position the head member about the trunk of a tree, and conform to the substantially circular nature of the trunk of the tree, and so that the arm members may when required be suitably clamped about the tree.

Further, the head member includes or provides for guide members 35 and 38 to be secured to the upper and lower ends of the head member, preferably so that the arm members 25 and 26 are spaced there between. The guide members may also be of a curved shape (in plan) so that they may partially conform to the shape of the trunk of the tree, although it is to be preferred that the curve be of a greater radius than the trunks of the trees about which the particular head member is to be positioned.

In one embodiment of the invention, the curves in the arm members may be appropriate for de-limbing and de-felling pulp trees of approximately 10 years of age, and with trunks of approximately 200–400 mm diameter, with the curves in the clamping arm members being of slightly greater radius, and with the curves in the guide members being of significantly greater radius.

The arm members 25 and 26 further include cutting means, preferably in the form of a knife edge, about the lower portion thereof, which cutting means are particularly adapted for the de-limbing of the tree. In one alternate embodiment of the invention, a similar knife edge may also be provided on the lower portion of guide members 35 and 38.

The invention furthermore provides for at least one shearing means to be provided, preferably mounted on the lower part of the body of the head member. This shearing means may comprise a pair of main shear knives 46 which in an open condition may be housed behind the guide member 38. These main shear knives may be each connected by main shear arms 45 to main shear cylinders 44. This main shear means may be provided for the felling of the tree. The preferred embodiment of the invention also includes a housing 49 for said shear means, which housing may assist in delimbing of the trees in the manner to be described herein.

Furthermore, in one preferred embodiment of the invention there is provided a second shear means, mounted on the top of the head member. This second shear means will generally be referred to as the top shear means, since it is provided to shear the top off the tree. This top shear means 50 may be of a similar, but smaller construction to the main shear means, so that it will include shear knives 56 connected to shear arms 55 which are in turn operated by top shear cylinders 54. The top shear means may also be provided in an appropriate housing 59.

Thus, there is provided a mechanism for attachment to a prime mover vehicle, which mechanism is capable of delimbing and felling a tree, and which in the preferred embodiment of the invention may also provide a top shear for topping the tree. The operation of the mechanism as now described will be appreciated from the following description of the method, and one preferred method of delimbing and felling a tree according to the invention.

Firstly, it will be appreciated that the mechanism of the present invention is in view of its function, of a suitably sturdy construction and may have its various functions controlled by means of suitable hydraulic circuitry. Such hydraulic circuitry may be controlled by the operator/driver of the prime mover, by means of a number of hand control levers, and/or foot pedals or the like for the various functions. It will be appreciated that all references in the specification to cylinders will refer to hydraulic cylinders operable by such hydraulic circuitry. It is envisaged that much of the hydraulic circuitry for effecting functions of the method according to the invention will be by automatic sequence, with control of the function by the operator.

The sequence of operation according to the method of the present invention is firstly commenced by the prime mover, being a tracked vehicle generally indicated by arrow 100 being suitably positioned adjacent to a tree in the manner shown in FIG. 1 of the drawings. The support member generally indicated by arrow 200 will be in its fully extended position, such that the head member (generally indicated by arrow 300) will be at position A. The invention provides that the body 24 of the head member 300 may be substantially coaxially aligned with the trunk of the tree by operation of tilt cylinders 41 and 42. Furthermore, where it is desired to position the head member 300 on the tree above the normal hydraulic arc of the fully extended support member 200, it is possible to tilt the boom 1 forward so that the head member may be positioned about the tree, with the arm members being then loosely closed on the tree. The support member is then fully extended through its hydraulic arc (generally indicated by dotted line 60), whereupon the tree will conform to the hydraulic arc and the head member 300 may move up the tree to a position above its normal operating height. It will be appreciated that even at this height, with the trunk of the tree being displaced in a curved shape that the head member 300 will be (as aforesaid) in coaxial alignment with the trunk of the tree. The operation of the positioning of the head member 300 about the tree as hereinbefore described may generally be referred to as the "positioning phase", and is completed by operation of the arm member cylinders 43 which cause said arm members 25 and 26 to be clamped about the tree.

The head member 300 will now be located at position A (as shown in the drawing) where it can in one preferred form of the invention complete a "top shearing phase", to shear off the top of the tree. This phase is effected by the operator moving a hand control lever from a neutral position to a first position such that the arm member cylinder 43 closes the arm members about the upper trunk of the tree so as to securely clamp the tree and the head member. Thereafter, or almost simultaneously with this function, another lever can be effected to operate the top shear cylinders 54. This closes the top shear means and thus shears off the top of the tree.

The harvester is then ready to commence the "delimbing phase". In particular, a first manual control lever is adaptable to operate both the hydraulic cylinder 43 for the clamping arm members, and the hydraulic cylinders 44 for the main shear means. This control lever is movable from a neutral position whereby the arm members are merely clasped loosely about the trunk, to a first position which operates the cylinders 43 to provide pressure of the clamping arm members about the tree. Therefore, the control lever is firstly provided in the neutral position. The harvester then commences the "delimbing phase" wherein the pressure in the boom cylinders and arm cylinders 40 is released by further control levers so that the support member 200 no longer supports the head member 300 at position A. The head member will therefore move down the tree under its own weight through "position B" to "position C" at the base of the tree (as shown in the drawings). This movement is effectively a "free fall" under gravity, although it will be appreciated that control of the head member is possible during this downward movement. Firstly, the universal type linkage of the head member to the arm member is controllable so as to enable the operator to control the tilt and twist of the head member 300 relative to the tree, so that the operator may continually maintain a position of the head member relative to the tree to prevent it from "digging in" to the tree and thus jamming the apparatus.

Further, during this delimbing phase, the operator moves the control lever for the clamping arm members forward and then back to its neutral position at intervals to maintain pressure in the clamping arm cylinders 43 for the clamping arm members, and so as to maintain the delimbing arms in contact with the tapered trunk. The limbs of the tree are during the delimbing phase principally sheared off by the delimbing knives 36 and 37 on the bottom edges of the arm members 25 and 26. Furthermore, some delimbing is effected by similar knife means which may be provided on the lower edges of the guide members 38 and 35, whilst of course some limbs are broken off by the housing and base 47 of the head member as it moves down the tree. It has been found in relation to the types of trees described herein, that the delimbing phase, wherein the head member moves from position A through position B to position C, takes approximately 3 seconds, and it will be appreciated therefore that during the delimbing phase, all the limbs of the tree are either sheared or broken off the trunk of the tree. Furthermore, it has been found that the clasping arrangement of the arm members 25 and 26 about the tree provides for removal of at least some of the bark from the tree during the delimbing phase, and it has been found that upwards of 20% of the bark may be removed from the tree during this phase.

The head member 300 has now moved to position C (as shown in the drawings) at which position the cylinder for the arms 25 and 26 is operated by the lever being moved forward to its first position to clamp the clamping arm members about the base of the trunk of the tree and thus position the tree trunk in the head member. The lever member for the hydraulic circuitry is then left in this first position, and by automatic sequential control, it is provided that immediately the clamping pressure has been reached, the hydraulic pressure effects operation of the main shear cylinders 44 to activate the main shear knives 46 and shear off the tree at its base. This operation is generally known and referred to as the "felling phase".

The operation may then provide for the release of the tree from the head member so that it merely falls to the ground.

However, in the preferred embodiment, the invention provides for the tree, which is clamped in the supported head member 300, to be picked up from its stump, moved as required and then tilted forward by operation of the tilt cylinders to be moved by the vehicle 100 into position D (shown in the drawings) where the lever member which controls the clamping arm members 25 and 26 and the main shear member may be released so the delimbed tree trunk is dropped onto the ground, and positioned preferably in a stack or bunch of other trees which have been felled from the surrounding area by the apparatus. This preferred operation is generally known and referred to as "bunching phase".

It will be appreciated that the mechanism of the present invention when mounted on the tractor (i.e. prime mover vehicle) 100 may move into a substantially central position in the forest, from which it may be maneuvered to delimb and fell all of the trees required to be removed in what is generally known as the thinning operation. Following the completion of the felling phase, each tree may be maneuvered into a position D such that repeated operation of the method as described will complete a "bunching phase" whereby a stack of delimbed and preferably topped tree trunks may be provided ready for collection.

The invention therefore provides a tree harvester including a mechanism for attachment to a prime mover vehicle, which facilitates, in the preferred embodiment as shown in the drawings, the following method of harvesting trees, including:

Positioning phase: where the mechanism attached to the prime mover is positioned about the tree;

Top Shearing Phase: where the top of the tree, is in one preferred embodiment of the invention, sheared off;

Delimbing phase: where the mechanism provides for a head member (as herein described) to move down the tree and shear off the limbs;

Felling phase: where the delimbed tree is positioned in the head member and sheared off from its base;

Bunching phase: where the delimbed tree trunk is positioned in a stack for collection.

It will be appreciated that the invention therefore provides for the complete harvesting of a tree into a log which is positioned in a convenient stack ready for transport to a mill for further processing. This mechanism, when mounted on a prime mover thus provides for a complete, efficient, and continuous method of harvesting trees, wherein each tree may be completely harvested in less than one minute in the manner hereinbefore described.

Where in the aforegoing description reference has been made to specific components or integers which have known equivalents in the art to which this invention relates, then such known equivalents are herein incorporated as if individually set forth.

Although this invention has been described by way of example only and with reference to one possible embodiment thereof it is to be understood that modifications and improvements may be made to the method of and the mechanism for performance of the invention without departing from the spirit thereof.

What we claim is:

1. A method of harvesting a tree comprising the steps of:
   (i) positioning a vehicle-mounted tree harvester apparatus including a head member adjacent to the upper trunk of a standing tree by support means extending from said vehicle;
   (ii) clasping delimbing means of said head member about the tree in a close fitting relationship;
   (iii) delimbing the tree by releasing said support means for said head member so that the head member gravitates down said tree independently of support from said tree, with the delimbing means in a clapsed relationship about the tree, and controlling the alignment of said head member relative to said tree by control means during said downward gravitation;
   (iv) clamping said head member about the base of the tree;
   (v) shearing off said tree;
   (vi) operating said support member so as to position the tree clamped within said head member where required, and releasing the tree from said head member.

2. A method of harvesting a tree as claimed in claim 1 and further comprising controlling the support member by support control means which are capable of supporting the support member, and at least partially releasing said support control means so that the head member may gravitate down the tree.

3. A method as claimed in claim 1 and further comprising shearing off the top of the tree by the supported head member when positioned about the upper trunk of the standing tree prior to releasing the support for said head member.

4. In a tree harvester apparatus for attachment to a prime mover vehicle, including:
   (i) a support member which is adjustable in height, a support control means capable of controlling the height and position of said support member; and
   (ii) a head member pivotably mounted on said support member and controlled by an alignment means, said head member including clamping means adapted to clamp or clasp about the trunk of the tree, delimbing means, and at least one shear member;
the improvement comprising means to at least partially release the control means for said support member when the head member is positioned about the upper trunk of a standing tree, to permit the head member to gravitate down the tree to its base whereby the delimbing means of the head member delimbs the tree, and following which the clamping means engages and supports the tree for shearing off and positioning where desired.

5. A tree harvester apparatus as claimed in claim 4 wherein the shear means comprises a first shear member mounted in the lower portion of the head member for shearing off the tree from its base, and a second shear member mounted in the upper portion of the head member for shearing off the top of the tree, and hydraulic cylinder means for each shear member mounted on said head member and operably connected to said shear member.

6. A tree harvester apparatus as claimed in claim 5 wherein a hydraulic control is provided operatively connected to said shear means so that the first and second shear members respectively operate to fell the tree and top the tree only when the tree is clamped by said clamping means.

7. A tree harvester apparatus as claimed in claim 5 wherein first and second guide means are mounted on the lower and upper portions of said head members, respectively and the first and second shear members each being provided within a housing mounted on said head member behind said first and second guide members, said first and second shear members extending through said guide means respectively from a retracted position to a closed position.

8. A tree harvester apparatus as claimed in claim 4 wherein said support member comprises a boom means pivotably connected at one end to said prime mover vehicle, and an arm means pivotably connected at one end to the other end of said boom means, said arm means being in turn pivotably connected at its other end to said head member, and wherein said support control means comprises at least one first hydraulically operable and controlled cylinder extending between the prime mover and the boom means, and at least one second hydraulically operable and controlled cylinder extending between the boom means and the arm means, respectively to support the boom means and the arm means of the support member.

9. A tree harvester as claimed in claim 8 wherein the boom means comprises a boom member and a first link member mounted in parallel therewith, and the arm means comprises an arm member with a second link member mounted in parallel therewith, so that the support member is comprised of a boom means and an arm means providing a pair of simultaneously operable parallel linkages.

10. A tree harvester as claimed in claim 9 wherein the pivotable connection between said boom means and said arm means comprises a triangular spacing link member having one apex pivotably engaged in the pivot between the boom member and said arm member, and the other apices pivotably engaged between said first and second link members to provide for simultaneous operation of the pairs of parallel linkages of said support member.

11. A tree harvester as claimed in claim 10 wherein said support member is provided with a mounting member and the outer ends of the arm member and the second link member are pivotably engaged with said mounting member, and the alignment means comprises at least one hydraulically operable and manually controlled tilt cylinder connected between said vehicle and parallel linkages of the support member to tilt the head member relative to its vertical axis substantially in the plane of vertical motion of said support member.

12. A tree harvester as claimed in claim 11 wherein the alignment means further comprises a pivot pin connecting said mounting member to said head member on a pivot axis substantially normal to the normal vertical axis of the head member, and a hydraulically operable and manually controlled alignment cylinder connected between said mounting member and said head member to pivot the head member relative to its vertical axis about the axis of said pivot pin.

13. A tree harvester apparatus as claimed in claim 5 wherein said clamping means comprises at least one clamp comprising a pair of clamping arm members each one of which is respectively mounted on one of a pair of adjacent parallel shafts, said shafts being pivotably mounted about their longitudinal co-parallel axes on said head member and pivotably operated by a pair of oppositely acting controlled hydraulic cylinders operably connected thereto.

14. A tree harvester apparatus as claimed in claim 13 wherein said clamping arm members are concave curved about a vertical axis of the head member and two of said clamps are provided positioned one above the other on said adjacent parallel shafts.

15. A tree harvester apparatus as claimed in claim 13 wherein the delimbing means comprises downwardly acting cutting blade portions provided on at least the lower edges of said clamping arm members.

16. A tree harvester apparatus as claimed in claim 4 wherein the head member further comprises first and second guide members having concave curved configurations about the vertical axis of said head member and adapted to engage the trunk of the tree, said second guide member disposed adjacent the top portion and said first guide member disposed adjacent the bottom portion of the head member with said clamping means therebetween.

17. A tree harvester apparatus as claimed in claim 16 wherein secondary delimbing means are provided comprising downwardly acting cutting blades mounted on said guide members.

18. A tree harvester apparatus as claimed in claim 13 wherein a manual control means is provided for the hydraulic control of the hydraulic cylinders pivoting said parallel shafts on which the clamping arm members are mounted, said control means being reciprocably operable between a neutral position where the clamping arm members are loosely clamped about the tree trunk and a first position to clamp said clamping arm members tightly about the tree trunk.

19. A tree harvester as claimed in claim 18 wherein said manual control means when maintained in said first position is adapted to sequentially operate the hydraulic cylinder means of the first shear means.

* * * * *